United States Patent
Agrawal et al.

(10) Patent No.: US 11,689,382 B2
(45) Date of Patent: *Jun. 27, 2023

(54) CONFIGURING MULTICAST COMMUNICATION

(71) Applicant: Skylo Technologies, Inc., Palo Alto, CA (US)

(72) Inventors: Meghna Agrawal, Cupertino, CA (US); Andrew Nuttall, Mountain View, CA (US); Vijay Lewis, Wylie, TX (US); Yihenew Dagne Beyene, Espoo (FI); Keijo Tapio Lehtinen, Espoo (FI)

(73) Assignee: Skylo Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,581

(22) Filed: Jun. 4, 2022

(65) Prior Publication Data

US 2022/0303146 A1 Sep. 22, 2022

Related U.S. Application Data

(63) Continuation of application No. 17/072,173, filed on Oct. 16, 2020, now Pat. No. 11,411,760.
(Continued)

(51) Int. Cl.
*H04L 12/18* (2006.01)
*H04W 28/02* (2009.01)
(Continued)

(52) U.S. Cl.
CPC ............ *H04L 12/189* (2013.01); *H04W 4/06* (2013.01); *H04W 28/0252* (2013.01); *H04W 72/0453* (2013.01)

(58) Field of Classification Search
CPC ... H04L 12/1881; H04L 12/189; H04L 45/16; H04W 4/06; H04W 28/0252; H04W 72/0453; H04W 72/30
See application file for complete search history.

(56) References Cited

U.S. PATENT DOCUMENTS 9,363,788 B2 * 6/2016 Zhang .................. H04W 72/04
9,792,129 B2 10/2017 Alicot et al.
(Continued)

FOREIGN PATENT DOCUMENTS

CN 103703844 A 4/2014
CN 113228712 A 8/2021

*Primary Examiner* — Khaled M Kassim
*Assistant Examiner* — Kai Chang
(74) *Attorney, Agent, or Firm* — Brian F. Short

(57) ABSTRACT

Apparatuses, methods, and systems for configuring multicast communication, are disclosed. One method includes generating, by a system platform, a multicast scheduling control packet based upon a distribution of a plurality of hubs, communicating, by the system platform, to a wireless communication base station the multicast scheduling control packet, generating, by the wireless communication base station, a plurality of multicast channel configurations based upon the multicast scheduling control packet, communicating, by the system platform, the multicast scheduling control packet to a wireless communication hub, wherein the wireless communication hub is one of the plurality of hubs, selecting, by the wireless communication hub, specific multicast channels from the plurality of multicast channel configurations, to receive specific multicast data based upon a condition of the hub and the multicast scheduling control packet, and receiving, by the wireless communication hub, multicast data through the selected specific multicast channel configurations.

19 Claims, 5 Drawing Sheets

Related U.S. Application Data

(60) Provisional application No. 63/065,289, filed on Aug. 13, 2020.

(51) Int. Cl.
*H04W 72/0453* (2023.01)
*H04W 4/06* (2009.01)

(56) References Cited

U.S. PATENT DOCUMENTS

| | | | |
|---|---|---|---|
| 11,477,255 B2* | 10/2022 | Zheng | H04L 12/1836 |
| 2008/0247372 A1 | 10/2008 | Chion et al. | |
| 2010/0054167 A1* | 3/2010 | Kawabata | H04L 12/189 |
| | | | 370/312 |
| 2011/0199913 A1* | 8/2011 | Sundaresan | H04L 12/1881 |
| | | | 370/312 |
| 2011/0299613 A1 | 12/2011 | Duff et al. | |
| 2014/0269637 A1 | 9/2014 | Banister et al. | |
| 2017/0201964 A1 | 7/2017 | Gupta et al. | |
| 2017/0332400 A1 | 11/2017 | Kowalski et al. | |
| 2017/0353945 A1* | 12/2017 | Navratil | H04L 12/1881 |
| 2018/0103453 A1* | 4/2018 | Cormier | H04L 12/1881 |
| 2019/0281418 A1* | 9/2019 | Chen | H04W 72/23 |
| 2020/0008130 A1* | 1/2020 | Yavuz | H04W 48/16 |
| 2021/0058149 A1 | 2/2021 | Nutall et al. | |
| 2021/0136532 A1* | 5/2021 | Liu | H04L 5/0048 |
| 2021/0282115 A1 | 9/2021 | Sengupta et al. | |

* cited by examiner

Multicast Scheduling Control Packet

Dictionary Maps: [ Groups of Hubs – Multicast Channel Configurations]

310

[ Hub Groups: 1, 5, 6 | Time Offset: 10 Frames | Periodicity: 5 Hyperframes | Scrambling Code: RNTI1]

320

[ Hub Groups: 10, 8, 6 | Time Offset: 5 Frames | Periodicity: 1 Hyper frame | Scrambling Code: RNTI1]

Figure 3

Generating, by a system platform, a multicast scheduling control packet based upon a distribution (firmware, customer, application, geography) of a plurality of network registered hubs
510

Communicating, by the system platform, to a wireless communication base station the multicast scheduling control packet
520

Generating, by the wireless communication base station, a plurality of multicast channel configurations based upon the multicast scheduling control packet
530

Communicating, by the system platform the multicast scheduling control packet to a wireless communication hub, wherein the wireless communication hub is one of the plurality of network registered hubs
540

Selecting, by the wireless communication hub, specific multicast channels from the plurality of multicast channel configurations, to receive specific multicast data based upon a condition (a configuration or an environment) the hub and the multicast scheduling control packet
550

Receiving, by the wireless communication hub, multicast data through the selected specific multicast channel configurations
560

Figure 5

CONFIGURING MULTICAST COMMUNICATION

RELATED PATENT APPLICATIONS

This patent application is a continuation of U.S. patent application Ser. No. 17/072,173, filed Oct. 16, 2020, which claims the benefit of U.S. Provisional Patent Application Ser. No. 63/065,289, filed Aug. 13, 2020, which is herein incorporated by reference.

FIELD OF THE DESCRIBED EMBODIMENTS

The described embodiments relate generally to wireless communications. More particularly, the described embodiments relate to systems, methods and apparatuses configuring multicast wireless communication.

BACKGROUND

The Internet of Things (IoT) includes large numbers of devices being connected to the internet. Due to the large number of devices, maintaining or updating the devices can be an onerous task.

It is desirable to have methods, apparatuses, and systems for configuring multicast wireless communication.

SUMMARY

An embodiment includes a method of configuring multicast communication. The method includes generating, by a system platform, a multicast scheduling control packet based upon a distribution (wherein the distribution includes one or more of a firmware, a customer, application, or a geography) of a plurality of network registered hubs, communicating, by the system platform, to a wireless communication base station the multicast scheduling control packet, generating, by the wireless communication base station, a plurality of multicast channel configurations based upon the multicast scheduling control packet, communicating (through the wireless communication base station or through some other means (such as, through a cellular network)), by the system platform the multicast scheduling control packet to a wireless communication hub, wherein the wireless communication hub is one of the plurality of network registered hubs, selecting, by the wireless communication hub, specific multicast channels from the plurality of multicast channel configurations, to receive specific multicast data based upon a condition (for example, a configuration or an environment) of the hub and the multicast scheduling control packet, and receiving, by the wireless communication hub, multicast data through the selected specific multicast channel configurations.

Another embodiment includes a system platform. The system platform is configured to generate a multicast scheduling control packet based upon a distribution of a plurality of network registered hubs, communicate to a wireless communication base station the multicast scheduling control packet, generate a plurality of multicast channel configurations based upon the multicast scheduling control packet, communicate the multicast scheduling control packet to a wireless communication hub, wherein the wireless communication hub is one of the plurality of network registered hubs, herein the wireless communication hub selects specific multicast channels from the plurality of multicast channel configurations, to receive specific multicast data based upon a condition of the hub and the multicast scheduling control packet, and wherein the wireless communication hub receives multicast data through the selected specific multicast channel configurations.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 3 show examples of multicast scheduling control packet generated by a system platform, according to an embodiment.

FIG. 5 is a flow chart that includes steps of a method of configuring multicast IoT (Internet of Things) communication, according to an embodiment.

DETAILED DESCRIPTION

The embodiments described include methods, apparatuses, and systems for modified multicast/broadcast wireless communication.

Figure 1:
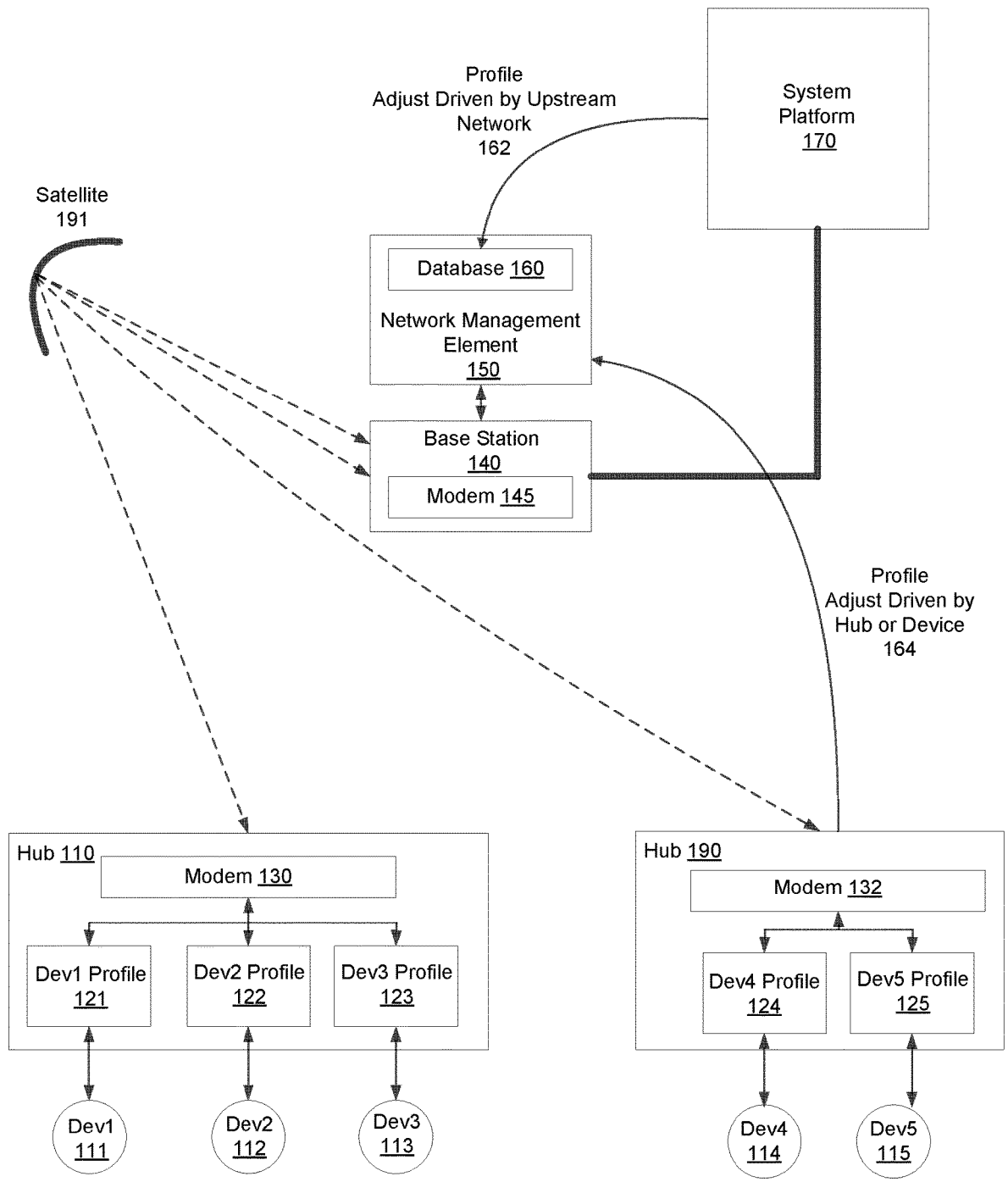
FIG. 1 shows wireless devices operating to communicate with a base station through a satellite, according to an embodiment.

FIG. 1 shows hubs 110, 190 operating to communicate with a base station 140 through a satellite 191, according to an embodiment. For at least some embodiments, the hubs 110, 190 are mobile devices. For an embodiment, the hubs 110, 190 are able to communicate with a system platform 180 through the base station 140. Modems 130, 132 of the hubs 110, 190, and modem 145 of the base station 145 enable the hubs 110, 190 to wirelessly communicate with the base station 140.

At least some embodiments include the system platform 170 updating operation of the hubs 110, 190. As there may be a large number of hubs for a single system platform, an embodiment includes the system platform facilitating multicasting of update information to many hubs, thereby efficiently updating the hubs. For example, the system platform 170 can simultaneously update firmware operating on many different hubs by controlling multicasting of firmware updates to the different hubs.

In computer networking, multicast is group communication where data transmission is addressed to a group of destination computers simultaneously. Multicast can be one-to-many or many-to-many distribution. Here, the destination computing devices are the hubs 110, 190, which are updated by the system platform 170. For an embodiment, the system platform 170 operates to create a multicast channel to enable firmware over the air updating of the hubs 110, 190. Further, the multicast channel supports updating other types of information of the hubs 110, 190. While only two hubs 110, 190 are shown in FIG. 1, the described embodiments for updating the hubs is applicable to very large numbers of hubs.

For at least some embodiments, the system platform 170 informs or alerts the hubs when a multicast is going to occur. Further, for at least some embodiments, each hub 110, 190 provides an indication to its corresponding hub modem 130, 132 to start receiving multicast packets transmissions from the base station 140.

For at least some embodiments, an application operating on each of the hubs 110, 190 operates to manage the reception of multicast packets. If, for example, the modem of the hub misses the reception of one or more multicast packets (for example, due to higher priority operations) the application operating on the hub manages the requesting of the missed one or more packets from the system platform 170. For example, the application operating on the hub may manage ACK ((acknowledgment) is a confirmation of receipt) and Nack (negative acknowledgment) responses to reception of multicast packets.

For an embodiment, a network management element 150 may access a database 160, aid in generating the schedule communication, and provide the scheduled communication to the base station 140. For an embodiment, the scheduled communication includes allocating frequency and time slots for both uplink and downlink wireless communication.

For an embodiment, the server 150 additionally generates a data profile 121, 122, 123, 124, 125 for each of the hubs 110, 190. For example, the server 150 generates the data profile that the base station 140 provides to the hubs 110, 190. For an embodiment, the data profile includes a periodicity, an offset, and a carrier frequency based on the scheduled communication. For an embodiment, the hubs 110, 190 utilizes the periodicity, the offset, and the carrier frequency of its data profile for determining when and at what carrier frequency to transmit uplink wireless communication to the base station 140.

For an embodiment, the base station 140 then receives uplink wireless communication from each of the plurality of hubs 110, 190 according to the data profile of each of the hubs 110, 190 and according to the scheduled communication. For an embodiment, the hubs 110, 190 use the data profiles 121, 122, 123, 124, 125 for determining when to transmit, and the base station 140 uses the scheduled communication to determine when to receive the uplink wireless communication. For at least some embodiments, each of the data profiles 121, 122, 123, 124, 125 corresponds with a data device 111, 112, 113, 114, 115 connected to the hubs 110, 190. The data devices 111, 112, 113, 114, 115 collected data that can be reported by the hubs 110, 190.

For an embodiment, after the time period of the scheduled communication, the base station 140 simultaneously broadcasts acknowledgments of reception of the uplink wireless communication from each of the plurality of hubs 110, 190. That is, the simultaneously broadcast acknowledgment includes acknowledgments directed to each of the individual hubs 110, 190 and indicates whether the scheduled uplink communication received from each of the individual hubs 110, 190 was successfully received. Each of the individual hubs 110, 190 can determine whether its uplink wireless communication was successfully received based on reception of the broadcast acknowledgment. That is, each of the hubs 110, 190 determine whether the uplink wireless communication was successful based on the simultaneously broadcast acknowledgments, wherein reception of the simultaneously broadcast acknowledgments by each hub is facilitated by the data profile of the hub. For an embodiment, the hub utilized the periodicity, the offset, and the carrier frequency within the data profile to determine or identify acknowledgments of uplink communication of the hub to the base station.

For an embodiment, the broadcast acknowledgment originates at the server 150. For an embodiment, the broadcast acknowledgment originates at the base station 140. By including the acknowledgments of many hubs within a single broadcast acknowledgment rather than generating a separate transmitted acknowledgment for each individual hub saves wireless communication air-time. This becomes more and more true as the number of hubs increases.

For at least some embodiments, the data profiles can be adjusted 164 by the hub or device, or the data profiles can be adjusted 162 by the system platform.

For at least some embodiments, the profiles are used for the conveying the multicast information to the hubs and/or devices.

Figure 2:
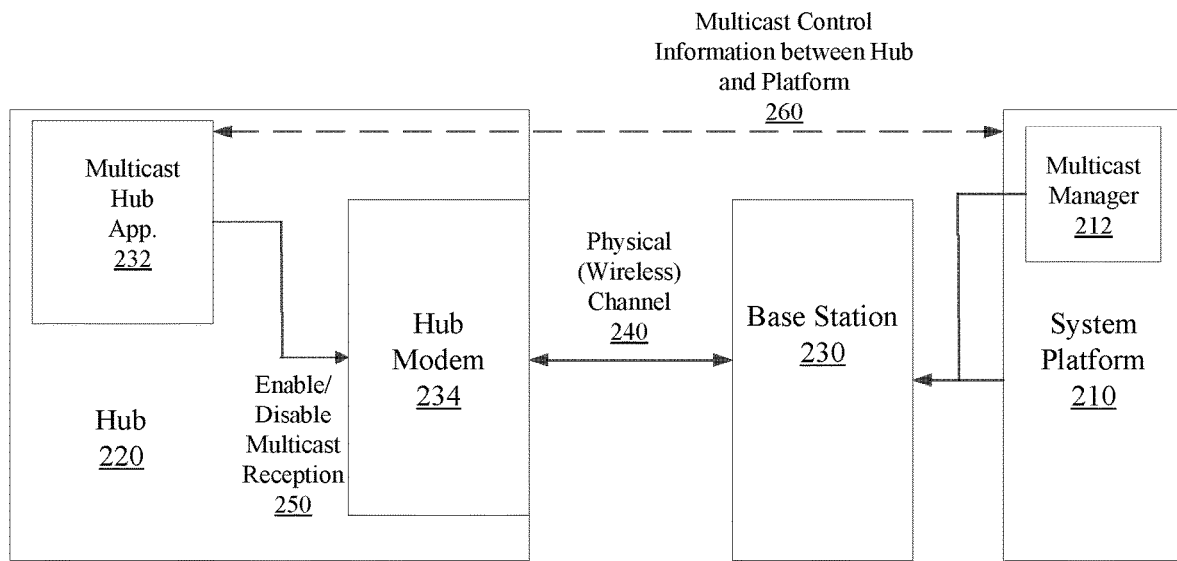
FIG. 2 shows a physical channel between a hub modem of a modem and a base station, and a virtual channel between the hub and a system platform, according to an embodiment.

FIG. 2 shows a physical channel 240 between a hub modem 234 of a hub 220 and a base station 230, and a virtual channel 260 between an application 232 of the hub 220 and a system platform 210, according to an embodiment. For an embodiment, a multicast manager 212 of the system platform 210 generates a multicast scheduling control packet based upon a distribution of a plurality of network registered hubs. The distribution of the network registered hubs can be based on a distribution of firmware operating on the hubs, the distribution of customers of the hubs, a distribution of application of use of the hubs, and/or based on the distribution of the geography of the hubs.

For an embodiment, the system platform 210 communicates the multicast scheduling control packet to the base station 230. For an embodiment, the base station 230 generates a plurality of multicast channel configurations based upon the multicast scheduling control packet.

Further, for an embodiment, system platform 210 also communicates the multicast scheduling control packet to the wireless communication hub 234, wherein the wireless communication hub 234 is one of the plurality of network registered hubs. For an embodiment, the system platform 210 communicates the multicast scheduling control packet to the wireless communication hub 234 through the base station 230. However, the multicast scheduling control packet does not have to be communicated to the wireless communication hub 234 through the base station 230. That is, for example, the system platform 210 may communicate the multicast scheduling control packet to the wireless communication hub 234 through another means. For example, a cellular or other wireless network (not shown in FIG. 2) can be utilized to facilitate this communication.

After having received the multicast scheduling control packet from the system platform 210, the wireless communication hub 234 selects specific multicast channels from the plurality of multicast channel configurations, to receive specific multicast data based upon a condition of the hub and the multicast scheduling control packet. That is, the multicast scheduling control packet includes multicast channel configurations of which the wireless communication hub 234 makes a selection. For an embodiment, the selection is based on a condition of the wireless communication hub 234, wherein the condition is based on a configuration of the wireless communication hub 234 or an environment of the wireless communication hub 234. For at least some embodiments, the configuration includes a current firmware version of the hub. For at least some embodiments, the configuration includes a hub battery status. For at least some embodiments, the configuration includes a subscription of the hub of certain multicast services. For at least some embodiments, the configuration includes a customer ID of the hub. For at least some embodiments, the configuration includes a multicast channel priority specified in the multicast channel configuration. For at least some embodiments, the environment includes a location of the hub.

After having selected the specific multicast channels, the wireless communication hub 234 then receives the multicast data through the selected specific multicast channel configurations.

FIG. 3 show examples of multicast scheduling control packet generated by a system platform, according to an embodiment. For at least some embodiments, the multicast scheduling control packet is an application layer data packet produced by the system platform based upon network traffic distributions that defines a dictionary of wireless hub groups and define when and with which coding multicast data is transmitted. A first exemplary multicast scheduling control packet 310 includes a dictionary of groups of hubs 1, 5, 6, a timing (timing offset of 10 frames and periodicity of 5 hyper frames), and a code RNT1. A second exemplary multicast scheduling control packet 320 includes a dictionary of groups of hubs 10, 8, 6, a timing (timing offset of 5 frames and periodicity of 1 hyper frame), and a code RNT1. That is, as shown, the exemplary multicast scheduling control packets 310, 320 include group identifiers, a time offset in frames, a periodicity in frames, a type of scrambling code.

As previously described, the base station 230 generates a plurality of multicast channel configurations based upon the multicast scheduling control packet, and the hub 234 selects specific multicast channels from the plurality of multicast channel configurations, to receive specific multicast data based upon a condition (configuration or an environment) of the hub and the multicast scheduling control packet. For an embodiment, the multicast channel configurations include or define the time, frequency, or code. Further, for at least some embodiments, the multicast channel configurations include additional parameters such as repetition of multicast transmissions, and/or and MCS (modulation and coding scheme). As shown and described, for an embodiment, time allocations of the multicast channel configurations are communicated to the hub through a time (frame) offset and periodicity (repeating every N frames).

For at least some embodiments, the multicast control packet is generated based on a network traffic distribution of the plurality of registered hubs. For an embodiment, a time allocated to a multicast transmission is adapted based upon network traffic. For example, during periods of light network traffic (for example, at night), more time may be allocated to multicast transmission. Further, multicast transmission may be reduced when, for example, a uncast traffic load of the network traffic distribution is greater than a threshold value.

As stated, for an embodiment, there is a distribution of firmware versions of the registered hubs. Further, for an embodiment, there is a distribution of device connectivity timings of the registered hubs. For an embodiment, the multicast assignment of channels of the multicast control packet is based upon the product of the distribution of firmware versions of the registered hubs and the distribution of device connectivity timings of the registered hubs. Further, for an embodiment, there is a distribution of device characteristics (battery status, location, device speed, etc) of the registered hubs. For an embodiment, the multicast assignment of channels of the multicast control packet is based upon the product of the distribution of device characteristics of the registered hubs and the distribution of device connectivity timings of the registered hubs.

As described, the hub 234 selects specific multicast channels from the plurality of multicast channel configurations. This includes the selection of specific multicast channel configurations from the plurality of multicast channel configurations. As previously described, for an embodiment, the selection is based on a condition of the wireless communication hub 234, wherein the condition is based on a configuration of the wireless communication hub 234 or an environment of the wireless communication hub 234.

As previously described, for an embodiment, a multicast manager 212 of the system platform 210 generates a multicast scheduling control packet based upon a distribution of a plurality of network registered hubs. For an embodiment the distribution of the plurality of registered hubs includes a distribution of versions of firmware of the plurality of registered hubs. That is, multiple versions of firmware for the hubs can simultaneously exist and be deployed on hubs in the field. Some versions may be more highly distributed than other versions. For an embodiment, updates to the firmware merely includes the difference between the deployed firmware and the current version to minimize the amount of data being wirelessly transmitted. Accordingly, versions of the deployed firmware with the most distribution can be allocated a greater amount of channel capacity. For at least some embodiments, time, code, and frequency allocations of the multicast channel configurations are proportionally allocated to different of the plurality of wireless communication hubs based on the distribution of firmware versions amongst the plurality of wireless communication hubs.

For at least some embodiments, the distribution of firmware versions varies based on an application of a customer who controls the hub. For at least some embodiments, the distribution of firmware versions varies based on a geography of hubs. At least some embodiments include continuously updating, by the system platform, the current firmware of each of the plurality of hubs. At least some embodiments include determining, by the hub, one or more missing firmware segments after a period of time, and requesting a unicast transmission of the missing firmware segments from the base station. At least some embodiments include determining, by the system platform, a preferred time of day for firmware updates based on past hub availability statistics For an embodiment, a one of the plurality of multicast channel configurations is selected for each of a plurality of hubs based on a current firmware version operating on each of the plurality of hubs.

At least some embodiments include the hub entering a sleep state during time allocations of the plurality of multicast channel configuration that the hub does not select for receiving multicast data.

As previously described, for an embodiment, the one or more of the of the plurality of multicast channel configurations further include scrambling codes. For an embodiment, the scrambling codes are defined by an RTNI (radio network temporary identifier). For an embodiment, the scrambling codes specify coding of the multicast information (multicast downlink control information). Hubs that are to receive the multicast transmissions are able to descramble the received multicast transmissions.

For an embodiment, the one or more of the of the plurality of multicast channel configurations further include security/encryption keys. Since the multicast channel configuration is already communicated via a secured unicast channel, the multicast channel configuration may also carry an encryption key.

For an embodiment, each of the plurality of multicast channel configurations includes a RTNI (radio network temporary identifier) dedicated for a multicast channel. The RNTIs are radio network temporary identifiers used to identify one radio channel from another. NBIoT (Narrow Band Internet of Things) has a limited set of RNTIs, in which some RNTIs are reserved for specific usages. For an embodiment, a subset of the available RNTIs are reserved for the system platform 210 (and manager 212) so that system platform 210 can use the reserved RNTIs for assigning multicast channels for multicasting packets from the base station 230 to the hub modem 234 of the hub 220. For an embodiment, the reserved set can be referred as multicast RNTIs. For an embodiment, the system platform 210 (and manager 212) configure the multicast channel by allocating different RNTI's from this reserved set to different multicast channels. For an embodiment, the multicast channel configurations also include resource allocation for downlink control information transmission along with a multicast transmission period. At least some embodiments include a subset of multicast channel configurations wherein multicast data is semi-statically scheduled on a predetermined set of resources without any associated DCI for the multicast data (as is done for Broadcast transmission). For an embodiment, the base station 230 periodically transmits multicast downlink control information (DCI) packets using the resources specified by system platform 210. For an embodiment, the multicast transmission period can be defined by a starting point of a hyper-frame and by a number of hyper-frames between consecutive multicast DCI transmissions.

For at least some embodiments, the multicast channel configuration includes a frequency and time slot for the downlink control information, and the RNTI is used to scramble the downlink control information. For an embodiment, the downlink control information includes a schedule for the following multicast packets. For an embodiment, the downlink control information includes an N, Y, and Z, wherein N is the total number of multicast packets included within a frame, Y is a separation in frames between each multicast packet, and Z is an offset in frames of a first multicast packet in frames. For an embodiment, the downlink control information is generated by the base station based on the multicast channel configuration and multicast packets received from system platform. For an embodiment, the base station can decide the schedule of multicast packets based on number and size of multicast packets received from the system platform. For an embodiment, the system platform also sends frequency and time slots for the downlink control information and the RNTI used to scramble downlink control information to the hub as part of the multicast channel configuration. For an embodiment the hub receives the multicast downlink control information using the multicast channel configuration.

For an embodiment, the downlink control information (DCI) includes a schedule for multiple downlink data packets. For an embodiment, CRC (cyclic redundancy) bits of the downlink control information packets are scrambled using the RNTI allocated for multicast channel. For an embodiment, since the RNTIs are used to scramble the DCI, the RNTIs may also referred as a scrambling code. For an embodiment, the hub 220 (through the hub modem 234) receives multicast packets using the multicast RNTI and resource configuration received from platform. Optionally, for an embodiment, the multicast channel configuration provided by platform also includes number of multicast packets scheduled by single multicast DCI.

For an embodiment, the hub 220 operates to receive through the hub modem 234 multicast packets from the wireless communication base station during time slots as defined by the specified resource timing of the one or more of the plurality of multicast channel configurations. For an embodiment, the multicast packets are transmitted by the wireless communication base station during time slots and using scrambling codes as defined by the specified resource timing and scrambling codes of the one or more of the plurality of multicast channel configurations.

For at least some embodiments, the system platform further operates to assign a one of the plurality of multicast channel configurations to each of a plurality of hubs based on a use of the plurality of hub or a tenant of the plurality of hubs, wherein is defined by a customer account. For example, if a tenant has 1000 hubs, then all those 1000 hubs can be assigned same multicast channel configuration. That is, a commonality between the different hubs, such as, the same customer account or same tenant can be used for the selection of a common multicast channel configuration for the different hubs. Further, for an embodiment, the multicast channel configuration can be assigned to multiple different hubs based on a commonality of use. For example, a common or same multicast channel configuration can be assigned to multiple hubs that have been designated as servicing fisheries (common use).

For at least some embodiments, the system platform further operates to assign a one of the plurality of multicast channel configurations to the hub based on a current firmware version operating on the hub. That is, the current firmware operating on the hub and the required additional firmware information needed to update the hub is used in selecting the one of the plurality of multicast channel configuration to be used in multicasting the firmware update.

As described, generally the system platform (multicast manager 212) 210 manages the updating of multiple hubs. Accordingly, for at least some embodiments, the system platform operates to assign a one of the plurality of multicast channel configurations to each of a plurality of hubs based on a current firmware version operating on each of the plurality of hubs. For at least some embodiments, multiple versions of firmware can be operating on different of many different hubs. That is, for example, there could be 5 different firmware versions running on different hubs in the network. Therefore, there will be 5 different delta image versions. For at least some embodiments, the system platform operates to coordinate with hubs in mass (depending upon firmware statistics and distributions) different configurations for multiple multicast channel configurations.

For at least some embodiments, based on the distribution of the firmware version used by the hubs, system platform identifies firmware versions that have higher distribution than other firmware versions, and prioritizes and creates the multicast channels to update those firmware versions. For a least some embodiments, the system platform also identifies and prioritizes firmware versions based on a criticality of fixes available in firmware updates (delta) and create multicast channels to update those firmware versions. The higher priority assigned to a hub based on the version of the firmware operating on the hub, the higher the priority the system platform multicast assigns channel allocations to the hub within the multicast scheduling control packet. That is, the timing and amount of channel allocations allocated to the hub are selected based on the priority (higher or lower) assigned to the hub.

At least some embodiments include continuously updating, by the system platform, the current firmware of each of the plurality of hubs. That is, the updating the firmware and firmware updates are constantly being streamed through the multicast broadcasts to maintain updating of the hubs supports by the system platform. That is, the updates can occur 24 hours a day, 7 days a week.

At least some embodiments include determining, by the hub, one or more missing firmware segments after a period of time, and requesting a unicast transmission of the missing firmware segments from the base station. That is, the hub may wait for the update from the continuous updating provided by the system platform. For an embodiment, the hub may wait for one or more updating cycles, and if the hub determines it is not getting the updates it needs, the hub can proactively request an update.

For at least some embodiments, the system platform further operates to enable or disable one or more of a plurality of hubs, whereby when disabled the one or more of the plurality of hubs do not receive multicast packets transmitted using the plurality of multicast channel configurations. The enable/disable functionality can be dynamic by dynamically updating a radio network temporary identifier which puts the hub modem 234 into a sleep mode or dictates that the hub modem 234 operate in a deaf mode in which no software updates are performed. For an embodiment, the one or more of the plurality of hubs are disabled by removing/changing the specified resource timing or scrambling codes.

For an embodiment, the system platform 210 can also dynamically enable/disable 250 or control a firmware update by providing the required firmware version information to hub 220. For an embodiment, multicast data packets received by hub 220 also include firmware update instructions and control information related to the firmware version available in the multicast channel. For an embodiment, the hub 220 uses that information to enable/disable 250 updates. For example, if the firmware version number in the multicast data packet indicates that a firmware update is firmware required for fisheries hubs, then the hubs which are used for agriculture can ignore the firmware update received. Further, for an embodiment, the system platform 210 divides the firmware updates into multiple segments and sends the different (multiple) segments through the multicast channel. For at least some embodiments, the firmware updates are divided into multiple segments, wherein a size of each of the multiple segments is determined or decided based on the resources allocated for multicast packets.

For at least some embodiments, multicast data packets transmitted using multicast channel configurations have two sections. For an embodiment, the two sections include a multicast packet header and multicast packet body. For an embodiment, the multicast header includes information regarding the multicast packet body. For example, when the multicast packet is used for firmware transmission, then the header can include a firmware version and segment number. For an embodiment, the hub uses the multicast packet header to accept/reject firmware received.

For an embodiment, the hub uses the firmware version and segment number to send Ack/Nack information to the system platform through the base station. For an embodiment, the system platform transmits the firmware segment for which Nack is received using either multicast channel configurations or existing NBIoT (narrow band internet of things) unicast channels.

For an embodiment, if Nack is received from multiple hubs for the same firmware segment then the system platform sends the same firmware update using the multicast channel. However, if Nack is received only from a few hubs then unicasts can be used.

For at least some embodiments, the system platform specifies a time of day for the multicast transmission based on an observed device availability pattern. For example, if from the data analysis it is observed that the probability of a device to be connected is highest between 8 am to 12 am, then system platform selects this time window for firmware segment retransmission.

For at least some embodiments, the system platform assigns different hub behaviors to different of the plurality of hubs. For an embodiment, at least one of the different behaviors require acknowledgments (ACKS) to be transmitted from a hub that is assigned a corresponding hub behavior upon receiving a multicast message. For an embodiment, the different behaviors are assigned based on an assigned channel or radio network temporary identifier (RNTI). For example, one RNTI invokes a required number of ACKs from the hub, and a different multicast RNTI does not.

For an embodiment, one hub behavior dictates that the hub response (transmit) an Ack (acknowledgment) for each of a plurality of the received firmware segments. For an embodiment, one hub behavior dictates that the hub response (transmit) a receive Nack for missed segments. For an embodiment, one hub behavior dictates that the hub response (transmit) a Group Ack after receiving N number of FW segments.

For at least some embodiments, at least one of the different behaviors require the hub modify a sleep routine of the hub based on the at least one of the specified resource timing of the one or more of the plurality of multicast channel configurations to reception of the multicast packets by the hub.

For at least some embodiments, different behaviors are assigned to each of a plurality of hubs based on an assigned QoS (quality of service) of the hub. For at least some embodiments, the assigned hub behavior can depend upon the QoS of the hub. For example, some of the hubs can receive network services with better reliability than others based on the network plan associated with the hub. For an embodiment, the hub behavior can also be determined based on the importance of multicast data being transmitted to the hub over the multicast channels. For example, some of the multicast channels might require an Ack from each of the hub and some might not.

Figure 4A:
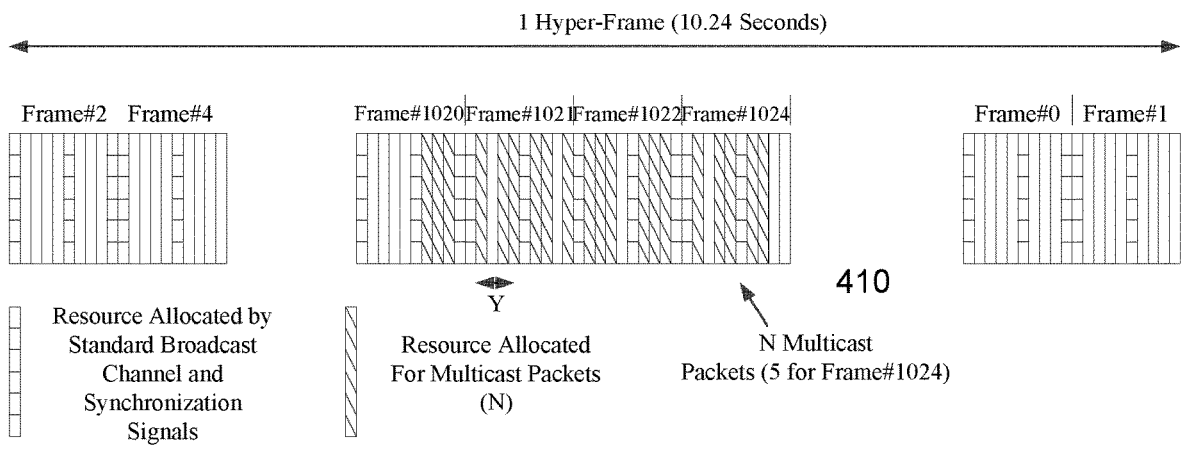
FIGS. 4A and 4B show hyper-frames of scheduled multicast packets, according to an embodiment.
Figure 4B:
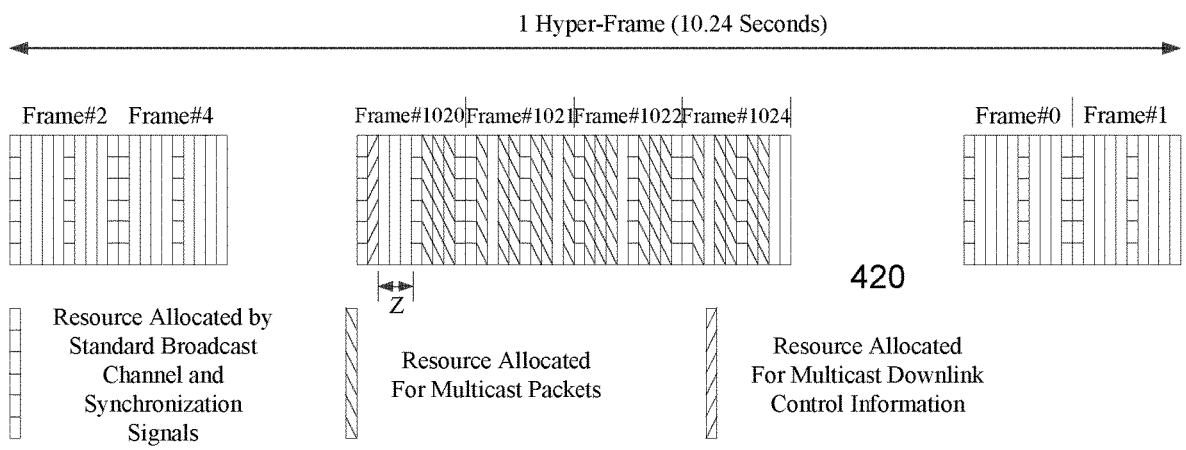

FIGS. 4A and 4B show hyper-frames 410, 340 of scheduled multicast packets, according to an embodiment. The hyper-frames 410, 420 include 1024 frames, and have a duration of 10.24 seconds. The frames (frame 0 through frame 1023) each include 10 time slots for packets. The hyper-frame 410 of FIG. 4A includes a first type time slot that includes packets that include resources allocated by a standard broadcast channel and synchronization signals. A second type of time slot includes packets that include resources allocated for multicast packets. FIG. 4B shows a third type of time slot (shown, for example, as the first time slot of frame #1020) that includes packets that include resources allocated for multicast downlink control information (DCI).

For at least some embodiments, at least one of the specified resource timing of the one or more of the plurality of multicast channel configurations is assigned to each of a plurality of hubs, and the at least one of the specified resource timing repeats for each of a plurality of hyper-frame cycles 410, 420. For an embodiment, resources (time and frequency slots) for multicast channel are assigned such that they don't conflict with the standard defined broadcast channel and synchronization signals. Further, resources are scheduled for data transmission do not conflict with broadcast channels.

At least some embodiments include transmitting, by the base station, downlink control information (DCI) as specified by the specified resource timing of the one or more of the plurality of multicast channel configurations, wherein the downlink control information includes schedule for N downlink multicast packets. Here, N is the total number of multicast packets included within a frame. As shown, frame #1023 includes N=5 multicast packets.

For at least some embodiments, each multicast packet is separated by Y frames. Here, Y is an interval between consecutive multicast packets (1 in FIG. 4A).

For at least some embodiments, a first multicast packet is offset by Z frames. As shown in FIG. 4B, in frame #1020, Z=1.

For an embodiment, N, Y, Z are specified within the downlink control information. For an embodiment, N, Y, Z are specified by the multicast channel configuration.

For at least some embodiments, resources for multicast channel are assigned such that they don't conflict with the standard defined broadcast channel and synchronization signals.

For at least some embodiments, the system platform assigns a one of the plurality of multicast channel configurations to each of a plurality of hubs comprises assigning the one of the plurality of multicast channel configurations to each of the plurality of hubs based on a geography of the hub. For an embodiment, the geography of the hub provides global and regional multicast channel configurations. For an embodiment, every channel/base station uses the same global RNTI or scheduling information, such that mobility is no issue for hubs which roam between base stations.

FIG. 5 is a flow chart that includes steps of a method of configuring multicast IoT communication, according to an embodiment. A first step 510 includes generating, by a system platform, a multicast scheduling control packet based upon a distribution (firmware, customer, application, geography) of a plurality of network registered hubs. A second step 520 includes communicating, by the system platform, to a wireless communication base station the multicast scheduling control packet. A third step 530 includes generating, by the wireless communication base station, a plurality of multicast channel configurations based upon the multicast scheduling control packet. A fourth step 540 includes communicating, by the system platform the multicast scheduling control packet to a wireless communication hub, wherein the wireless communication hub is one of the plurality of network registered hubs. A fifth step 550 includes selecting, by the wireless communication hub, specific multicast channels from the plurality of multicast channel configurations, to receive specific multicast data based upon a condition (a configuration or an environment) the hub and the multicast scheduling control packet. A sixth step 560 includes receiving, by the wireless communication hub, multicast data through the selected specific multicast channel configurations.

As described, for an embodiment, the distribution of the plurality of registered hubs includes a distribution of versions of firmware of the plurality of registered hubs. That is, multiple versions of firmware for the hubs can simultaneously exist and be deployed on hubs in the field. Some versions may be more highly distributed than other versions. For an embodiment, updates to the firmware merely includes the difference between the deployed firmware and the current version to minimize the amount of data being wirelessly transmitted. Accordingly, versions of the deployed firmware with the most distribution can be allocated a greater amount of channel capacity. For at least some embodiments, time, code, and frequency allocations of the multicast channel configurations are proportionally allocated to different of the plurality of wireless communication hubs based on the distribution of firmware versions amongst the plurality of wireless communication hubs.

For an embodiment, the distribution of firmware versions varies based on an application of a customer who controls one or more of the plurality of network registered hubs. For at least some embodiments, the distribution of firmware versions varies based on a geography of hubs. At least some embodiments include continuously updating, by the system platform, the current firmware of each of the plurality of hubs. At least some embodiments include determining, by the hub, one or more missing firmware segments after a period of time, and requesting a unicast transmission of the missing firmware segments from the base station. At least some embodiments include determining, by the system platform, a preferred time of day for firmware updates based on past hub availability statistics.

As described, for an embodiment, the multicast scheduling control packet is generated based on a network traffic distribution of the plurality of registered hubs. For an embodiment, a time allocated to a multicast transmission is adapted based upon network traffic. For example, during periods of light network traffic (for example, at night), more time may be allocated to multicast transmission. Further, multicast transmission may be reduced when, for example, a uncast traffic load of the network traffic distribution is greater than a threshold value.

As stated, for an embodiment, there is a distribution of firmware versions of the registered hubs. Further, for an embodiment, there is a distribution of device connectivity timings of the registered hubs. For an embodiment, the multicast assignment of channels of the multicast control packet is based upon the product of the distribution of firmware versions of the registered hubs and the distribution of device connectivity timings of the registered hubs. Further, for an embodiment, there is a distribution of device characteristics (battery status, location, device speed, etc) of the registered hubs. For an embodiment, the multicast assignment of channels of the multicast control packet is based upon the product of the distribution of device characteristics of the registered hubs and the distribution of device connectivity timings of the registered hubs.

As described, for an embodiment, the plurality of multicast channel configurations comprises time, code, or frequency allocations for multicast data transmissions.

As described, for an embodiment, the wireless communication hub enters a sleep state during time allocations of the plurality of multicast channel configurations that the wireless communication hub does not select for receiving multicast data.

As described, at least some embodiments include enabling or disabling, by the system platform, one or more of a plurality of hubs, whereby when disabled the one or more of the plurality of hubs do not receive multicast packets transmitted using the plurality of multicast channel configurations.

As described, at least some embodiments include selecting the specific multicast channels based on a geography of the hub. For an embodiment, the geography of the hub provides global and regional multicast channel configurations. At least some embodiments include selecting the specific multicast channels based on one or more of time, location, market application, customer, device identification, subscription identification or a device state. For an embodiment, the device state includes a battery level of the device.

As described, at least some embodiments include coordinating by the wireless communication base station and the wireless communication hub, reservations of time slots to multicast data to mitigate the time slots from being used for other transmissions.

Although specific embodiments have been described and illustrated, the embodiments are not to be limited to the specific forms or arrangements of parts so described and illustrated. The described embodiments are to only be limited by the claims.

What is claimed:

1. A method of configuring multicast communication, comprising:
    generating a multicast scheduling control packet based upon a distribution of a plurality of hubs;
    generating, by a wireless communication base station, a plurality of multicast channel configurations based upon the multicast scheduling control packet;
    communicating, by the wireless communication base station, to a wireless communications hub the plurality of multicast channel configurations;
    communicating, by the wireless communication base station, the multicast scheduling control packet to the wireless communication hub, wherein the wireless communication hub is one of the plurality of hubs;
    selecting, by the wireless communication hub, specific multicast channels from the plurality of multicast channel configurations, to receive specific multicast data based on the multicast scheduling control packet; and
    receiving, by the wireless communication hub, multicast data through the selected specific multicast channel configurations;
    wherein the plurality of multicast channel configurations comprises time, code, or frequency allocations for multicast data transmissions.

2. The method of claim 1, wherein the distribution of the plurality of hubs comprises a distribution of versions of firmware of the plurality of hubs.

3. The method of claim 2, wherein the distribution of firmware versions varies based on an application of a customer who controls one or more of the plurality of hubs.

4. The method of claim 1, wherein the multicast scheduling control packet is generated based on a network traffic distribution of the plurality of hubs.

5. The method of claim 1, wherein the plurality of multicast channel configurations further includes at least one of an MCS (modulation and coding scheme) or a number of repetitions of multicast transmissions.

6. The method of claim 1, further comprising the wireless communication hub entering a sleep state during time allocations of the plurality of multicast channel configurations that the wireless communication hub does not select for receiving multicast data.

7. The method of claim 1, wherein time, code, and frequency allocations of the plurality of multicast channel configurations are proportionally allocated to different of the plurality of hubs based on a distribution of firmware versions amongst the plurality of hubs.

8. The method of claim 7, wherein time allocations of the plurality of multicast channel configurations are communicated to the wireless communication hub through a time (frame) offset and periodicity (repeating every N frames).

9. The method of claim 1, further comprising:
    enabling or disabling, by the system platform, one or more of the plurality of hubs, whereby when disabled the one or more of the plurality of hubs do not receive multicast packets transmitted using the plurality of multicast channel configurations.

10. The method of claim 1, further comprising:
    assigning, by the system platform, different hub behaviors to different of the plurality of hubs.

11. The method of claim 10, wherein at least one of the different behaviors require acknowledgements (ACKS) to be transmitted from a hub that is assigned a corresponding hub behavior upon receiving a multicast message.

12. The method of claim 10, wherein at least one of the different behaviors require the wireless communication hub to modify a sleep routine of the wireless communication hub based on the at least one of the specified resource timing of the one or more of the plurality of multicast channel configurations to reception of the multicast packets by the wireless communication hub.

13. The method of claim 10, wherein different behaviors are assigned to each of a plurality of hubs based on an assigned QoS (quality of service) of the wireless communication hub.

14. The method of claim 1, further comprising:
    transmitting, by the base station, downlink control information as specified by specified resource timing of the one or more of the plurality of multicast channel configurations, wherein the downlink control information includes schedule for N downlink multicast packets.

15. The method of claim 1, selecting the specific multicast channels comprises selecting the specific multicast channels based on a geography of the wireless communications hub.

16. The method of claim 15, wherein the geography of the wireless communication hub provides global and regional multicast channel configurations.

17. The method of claim 1, selecting the specific multicast channels comprises selecting the specific multicast channels based on one or more of time, location, market application, customer, device identification, subscription identification or a device state.

18. The method of claim 1, further comprising coordinating by the wireless communication base station and the wireless communication hub, reservations of time slots to multicast data to mitigate the time slots from being used for other transmissions.

19. A system platform, the system platform configured to:
    generate a multicast scheduling control packet based upon a distribution of a plurality of hubs;
    generate a plurality of multicast channel configurations based upon the multicast scheduling control packet;
    communicate, by the wireless communication base station, to a wireless communications hub the plurality of multicast channel configurations;
    communicate the multicast scheduling control packet to the wireless communication hub, wherein the wireless communication hub is one of the plurality of hubs;
    wherein the wireless communication hub selects specific multicast channels from the plurality of multicast channel configurations, to receive specific multicast data based on the multicast scheduling control packet; and
    wherein the wireless communication hub receives multicast data through the selected specific multicast channel configurations;
    wherein the plurality of multicast channel configurations comprises time, code, or frequency allocations for multicast data transmissions.

* * * * *